United States Patent
Thubert et al.

(10) Patent No.: US 10,673,734 B2
(45) Date of Patent: Jun. 2, 2020

(54) PACKET REPLICATION OVER CHAINS OF CASCADED RESILIENT LINK LAYER SEGMENTS

(71) Applicant: Cisco Technology, Inc., San Jose, CA (US)

(72) Inventors: Pascal Thubert, La Colle Sur Loup (FR); Jean-Philippe Vasseur, Saint Martin d'Uriage (FR); Patrick Wetterwald, Mouans Sartoux (FR); Eric Michel Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/126,859

(22) Filed: Sep. 10, 2018

(65) Prior Publication Data

US 2020/0084135 A1    Mar. 12, 2020

(51) Int. Cl.
*H04L 12/751* (2013.01)
*H04L 12/707* (2013.01)
(Continued)

(52) U.S. Cl.
CPC .......... *H04L 45/02* (2013.01); *H04L 12/4625* (2013.01); *H04L 12/4641* (2013.01);
(Continued)

(58) Field of Classification Search
CPC ..... H04L 65/4084; H04L 29/08; H04L 12/24; H04L 63/0414; G06F 13/07; G06F 15/16; H04B 10/616; H04W 16/10; H04W 24/04
See application file for complete search history.

(56) References Cited

U.S. PATENT DOCUMENTS

| 8,526,443 B2 | 9/2013 | Baykal et al. |
| 8,711,752 B2 | 4/2014 | Liu et al. |

(Continued)

OTHER PUBLICATIONS

Broadcom, "BCM53570 1G/2.5G/10G/25G TSN Connectivity Switch", Product Brief, [online], [retrieved on Jul. 9, 2018]. Retrieved from the Internet: URL: <https://docs.broadcom.com/docs/53570-PB101>, 2 pages.

(Continued)

*Primary Examiner* — Iqbal Zaidi
(74) *Attorney, Agent, or Firm* — Leon r. Turkevich

(57) ABSTRACT

In one embodiment, a method comprises generating a switched link layer topology from a source device to a destination device, the switched link layer topology comprising a first sequence of switching devices, a second sequence of switching devices, and one or more bridging links between the first and second sequences of switching devices; generating first and second chains of resilient link layer segments for respective first and second multi-hop link layer connections based on generating a sequence of link layer loops overlying the switched link layer topology, and setting for each of the first and second multi-hop link layer connections a corresponding set of connection blocks in each link layer loop; and causing replication of a data packet across the first and second multi-hop link layer connections, enabling a failure in the switched link layer topology to be bypassed based on removing at least one of the connection blocks.

20 Claims, 9 Drawing Sheets

(51) Int. Cl.
 H04L 12/761 (2013.01)
 H04L 12/703 (2013.01)
 H04L 12/46 (2006.01)
 H04L 12/721 (2013.01)
 H04L 12/933 (2013.01)

(52) U.S. Cl.
 CPC ............ *H04L 45/16* (2013.01); *H04L 45/24* (2013.01); *H04L 45/28* (2013.01); *H04L 45/66* (2013.01); *H04L 49/15* (2013.01)

(56) References Cited

U.S. PATENT DOCUMENTS

| | | | |
|---|---|---|---|
| 8,897,135 | B2 | 11/2014 | Thubert et al. |
| 9,088,502 | B2 | 7/2015 | Thubert et al. |
| 9,112,788 | B2 | 8/2015 | Thubert et al. |
| 9,226,292 | B2 | 12/2015 | Thubert et al. |
| 9,246,794 | B2 | 1/2016 | Thubert et al. |
| 9,264,243 | B2 | 2/2016 | Thubert et al. |
| 9,320,036 | B2 | 4/2016 | Thubert et al. |
| 9,338,086 | B2 | 5/2016 | Thubert et al. |
| 2006/0036719 | A1* | 2/2006 | Bodin ............... H04L 29/12009 709/223 |
| 2007/0165518 | A1 | 7/2007 | Bruckman et al. |
| 2008/0316917 | A1* | 12/2008 | Farkas ................ H04L 12/4625 370/221 |
| 2015/0023327 | A1 | 1/2015 | Thubert et al. |
| 2016/0308789 | A1 | 10/2016 | Schmelzer et al. |
| 2017/0222920 | A1 | 8/2017 | Thubert et al. |
| 2019/0141016 | A1* | 5/2019 | Borrill ............... H04L 63/0428 |

OTHER PUBLICATIONS

IEC, "62439-3 Ed.2.0: Industrial communication networks—High availability automation networks—Part 3: Parallel Redundancy Protocol (PRP) and High-availability Seamless Redundancy (HSR)", 2012, pp. 1-84.

AVNU Alliance, "AVNU", 2018, [online], [retrieved on Jul. 9, 2018]. Retrieved from the Internet: URL: <http://avnu.org/>, pp. 1-2.

Cisco, "Parallel Redundancy Protocol (PRP) for IE 4000, IE 4010, and IE 5000 Switches", Jun. 26, 2018, [online], [retrieved on Jul. 9, 2018]. Retrieved from the Internet: URL: <https://www.cisco.com/c/en/us/td/docs/switches/lan/industrial/software/configuration/guide/b_prp_ie4k_5k.pdf>, pp. 1-28.

IETF Datatracker, "Deterministic Networking (detnet)", Jul. 5, 2018, [online], [retrieved on Jul. 9, 2018]. Retrieved from the Internet: URL: <https://datatracker.ietf.org/wg/detnet/about/>, pp. 1-4.

Finn, "Time-sensitive and Deterministic Networking Whitepaper", Jul. 11, 2017, [online], [retrieved on Aug. 24, 2018]. Retrieved from the Internet: URL: <https://mentor.ieee.org/802.24/dcn/17/24-17-0020-00-sgtg-contribution-time-sensitive-and-deterministic-networking-whitepaper.pdf>, pp. 1-24.

IEEE 802.1 Time-Sensitive Networking Task Group "Time-Sensitive Networking Task Group", May 3, 2017, [online], [retrieved on Jul. 9, 2018]. Retrieved from the Internet: URL: <http://www.ieee802.org/1/pages/tsn.html>, pp. 1-4.

Industrial Internet Consortium, "Smart Printing Factory", 2018, [online], [retrieved on Jul. 9, 2018]. Retrieved from the Internet: URL: <https://www.iiconsortium.org/>, pp. 1-5.

Cisco, "Configuring Resilient Ethernet Protocol", [online], [retrieved on Jul. 9, 2018]. Retrieved from the Internet: URL: <https://www.cisco.com/c/en/us/td/docs/ios-xml/ios/lanswitch/configuration/xe-3s/asr903/lanswitch-xe-3s-asr903-book/lsw-cfg-rep.pdf>, pp. 1-28.

Nelakuditi et al., "Fast Local Rerouting for Handling Transient Link Failures", IEEE/ACM Transactions on Networking, vol. 15, No. 2, Apr. 2007, [online], [retrieved on Mar. 23, 2018]. Retrieved from the Internet: URL: <http://ieexplore.ieee.org/document/4154760/>, pp. 359-372.

Cho et al., "Independent Directed Acyclic Graphs for Resilient Multipath Routing", IEEE/ACM Transactions on Networking vol. 20, No. 1, Feb. 2012, [online], [retrieved on Mar. 23, 2018]. Retrieved from the Internet: URL: <http://ieeexplore.ieee.org/document/6003807/>, pp. 153-162.

OPC Foundation, "Unified Architecture", 2018, [online], [retrieved on Jul. 9, 2018]. Retrieved from the Internet: URL: <https://opcfoundation.org/about/opc-technologies/opc-ua/>, pp. 1-3.

\* cited by examiner

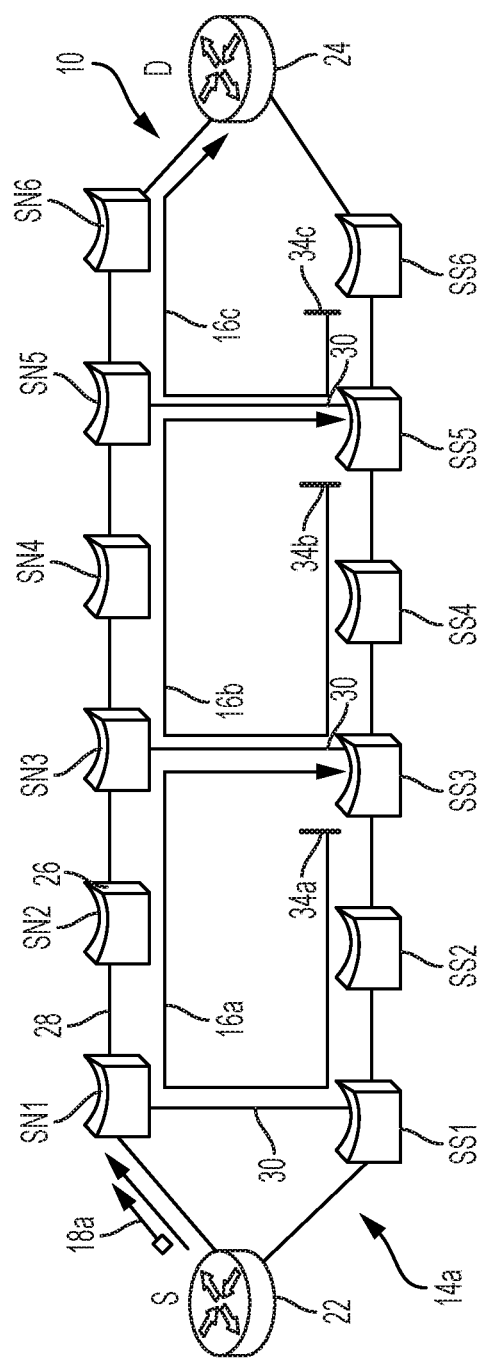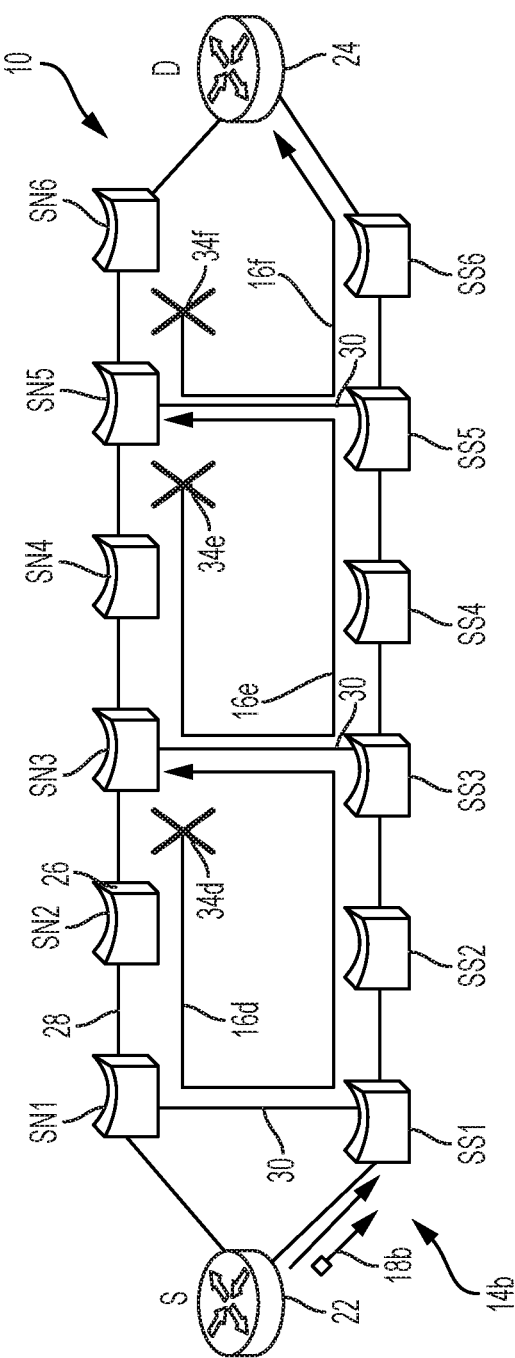

10,673,734 B2

PACKET REPLICATION OVER CHAINS OF CASCADED RESILIENT LINK LAYER SEGMENTS

TECHNICAL FIELD

The present disclosure generally relates to packet replication over chains of cascaded resilient link layer segments.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Various technologies (e.g., industrial automation, power automation, autonomous vehicles, etc.) demand highly reliable and resilient control systems. Hence, attempts to modernize such industrial automation and power automation with Internet Protocol (IP) based data networks require that the IP based data networks can transmit data packets in a reliable and resilient manner. Different attempts to satisfy such demands have included Time Sensitive Networking (TSN), Industrial Ethernet, Deterministic Networking (DetNet), Parallel Redundancy Protocol (PRP), Packet Replication and Elimination (PRE), and Resilient Ethernet Protocol (REP).

Packet Replication (e.g., PRP, PRE) attempts to improve reliability by attempting to transmit copies of a data packet via different paths: PRE is utilized in TSN and DetNet, whereas PRP is defined by the International Standard IEC 62439-3 and is used in Ethernet-based networks. Resilient Ethernet Protocol (REP) is an alternative to the Spanning Tree Protocol (STP) and that uses a block in a single ring segment to prevent a loop in the segment.

BRIEF DESCRIPTION OF THE DRAWINGS

Reference is made to the attached drawings, wherein elements having the same reference numeral designations represent like elements throughout and wherein:

FIGS. 1A-1G illustrates an example data network having an apparatus for generating chains of resilient link layer segments for replication of a data along respective multi-hop link layer connections, according to an example embodiment.

DESCRIPTION OF EXAMPLE EMBODIMENTS

Overview

Figure 1A:
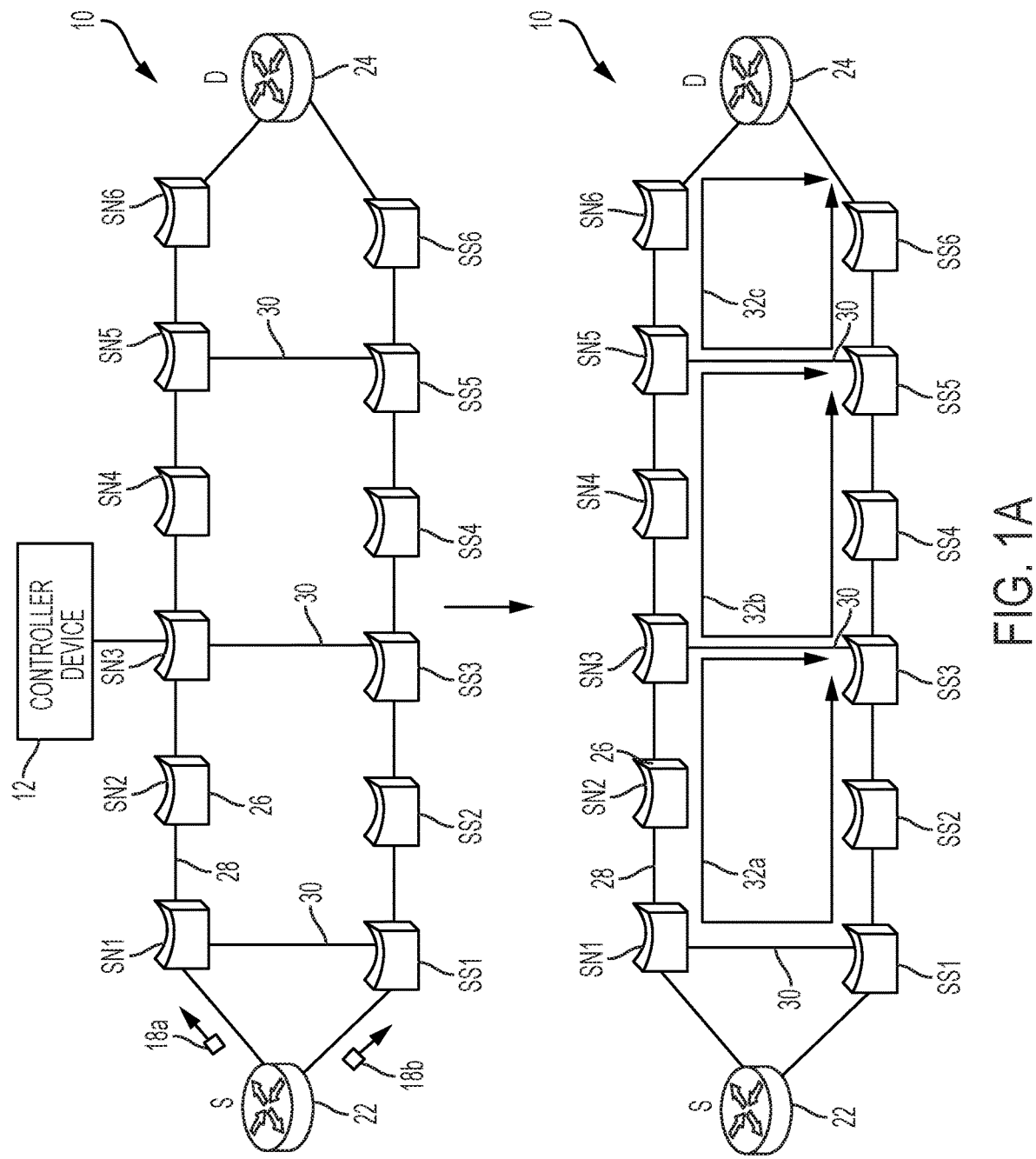

In one embodiment, a method comprises: generating a switched link layer topology from a source device to a destination device, the switched link layer topology comprising a first sequence of switching devices, a second sequence of switching devices, and one or more bridging links between the first and second sequences of switching devices; generating first and second chains of resilient link layer segments for respective first and second multi-hop link layer connections based on generating a sequence of link layer loops overlying the switched link layer topology, and setting for each of the first and second multi-hop link layer connections a corresponding set of connection blocks in each link layer loop; and causing replication of a data packet across the first and second multi-hop link layer connections, enabling a failure in the switched link layer topology to be bypassed based on removing at least one of the connection blocks for an affected one of the first or second multi-hop link layer connections.

In another embodiment, an apparatus comprises a processor circuit and a device interface circuit. The processor circuit is configured for generating a switched link layer topology from a source device to a destination device, the switched link layer topology comprising a first sequence of switching devices, a second sequence of switching devices, and one or more bridging links between the first and second sequences of switching devices. The processor circuit further is configured for generating first and second chains of resilient link layer segments for respective first and second multi-hop link layer connections based on generating a sequence of link layer loops overlying the switched link layer topology, and setting for each of the first and second multi-hop link layer connections a corresponding set of connection blocks in each link layer loop. The device interface circuit configured for causing replication of a data packet across the first and second multi-hop link layer connections, enabling a failure in the switched link layer topology to be bypassed based on removing at least one of the connection blocks for an affected one of the first or second multi-hop link layer connections.

In another embodiment, one or more non-transitory tangible media are encoded with logic for execution by a machine and when executed by the machine operable for: generating a switched link layer topology from a source device to a destination device, the switched link layer topology comprising a first sequence of switching devices, a second sequence of switching devices, and one or more bridging links between the first and second sequences of switching devices; generating first and second chains of resilient link layer segments for respective first and second multi-hop link layer connections based on generating a sequence of link layer loops overlying the switched link layer topology, and setting for each of the first and second multi-hop link layer connections a corresponding set of connection blocks in each link layer loop; and causing replication of a data packet across the first and second multi-hop link layer connections, enabling a failure in the switched link layer topology to be bypassed based on removing at least one of the connection blocks for an affected one of the first or second multi-hop link layer connections.

DETAILED DESCRIPTION

Particular embodiments enable an apparatus to construct chains of resilient link layer segments, overlying a switched link layer topology between a source network device and a destination network device, and allocate the chains to first and second multi-hop link layer connections, enabling multi-hop link layer transport of replicated copies of a data packet across first and second multi-hop link layer connections via respective chains of resilient link layer segments. In particular, an apparatus can construct a first chain of resilient link layer segments for transport of data packets associated with a first multi-hop link layer connection (e.g., a first virtual local area network (VLAN) "VLAN_N"), and a second chain of resilient link layer segments can be constructed for transport of data packets associated with a second multi-hop link layer connection (e.g., a second VLAN).

A first copy of a replicated data packet can be transported via a first multi-hop link layer connection (e.g., a first virtual local area network "VLAN_N") having been allocated the first chain of resilient link layer segments, and a second copy of a replicated data packet can be transported via a second multi-hop link layer connection (e.g., a second virtual local area network "VLAN_S") having been allocated the second chain of resilient link layer segments. As described below, the replication of the data packet across the first and second multi-hop link layer connections (via the respective chains of resilient link layer segments) enables one or more failures in the switched link layer topology to be bypassed quickly at the link layer, with minimal delay.

FIGS. 1A-1G illustrate an example data network 10 implemented as a switched link layer topology and having an apparatus (e.g., 12 of FIG. 1A) configured for generating chains (e.g., 14a of FIGS. 1B, 1C, 1E, 1F; 14b of FIGS. 1B and 1D) of resilient link layer segments (e.g., 16a, 16b, 16c of FIGS. 1B and 1C; 16d, 16e, 16f of FIGS. 1B and 1D) for transmission of replicated data packets (e.g., 18a, 18b of FIGS. 1A, 1B, and 1G) from a source network device "S" 22 along respective multi-hop link layer connections 20a, 20b toward a destination network device "D" 24, according to an example embodiment. The apparatus 12 can generate the chains 14a, 14b of resilient link layer segments 16 overlying the data network 10 implemented as a switched link layer topology having switching devices 26.

Figure 1B:
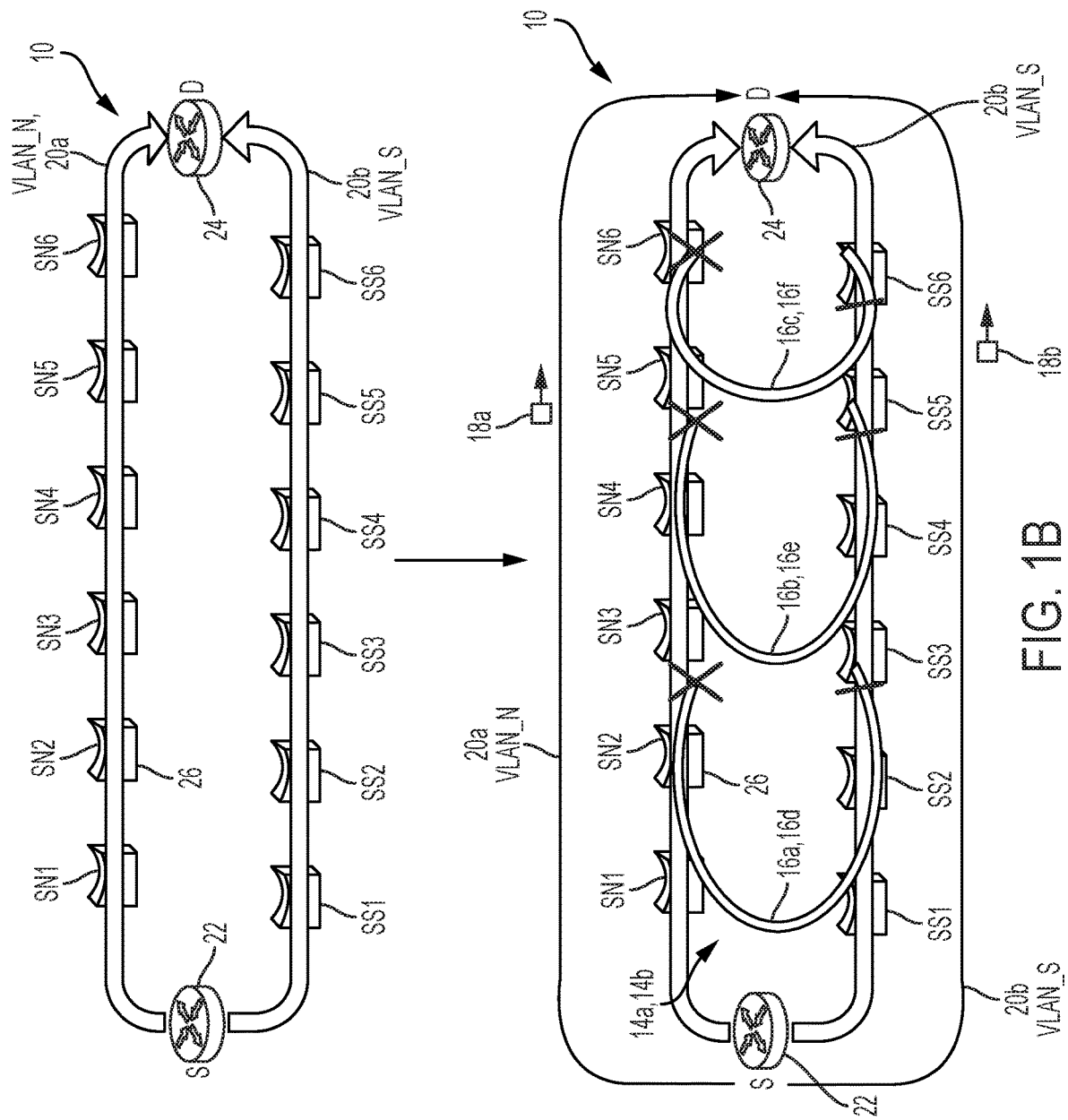
Figure 1E:
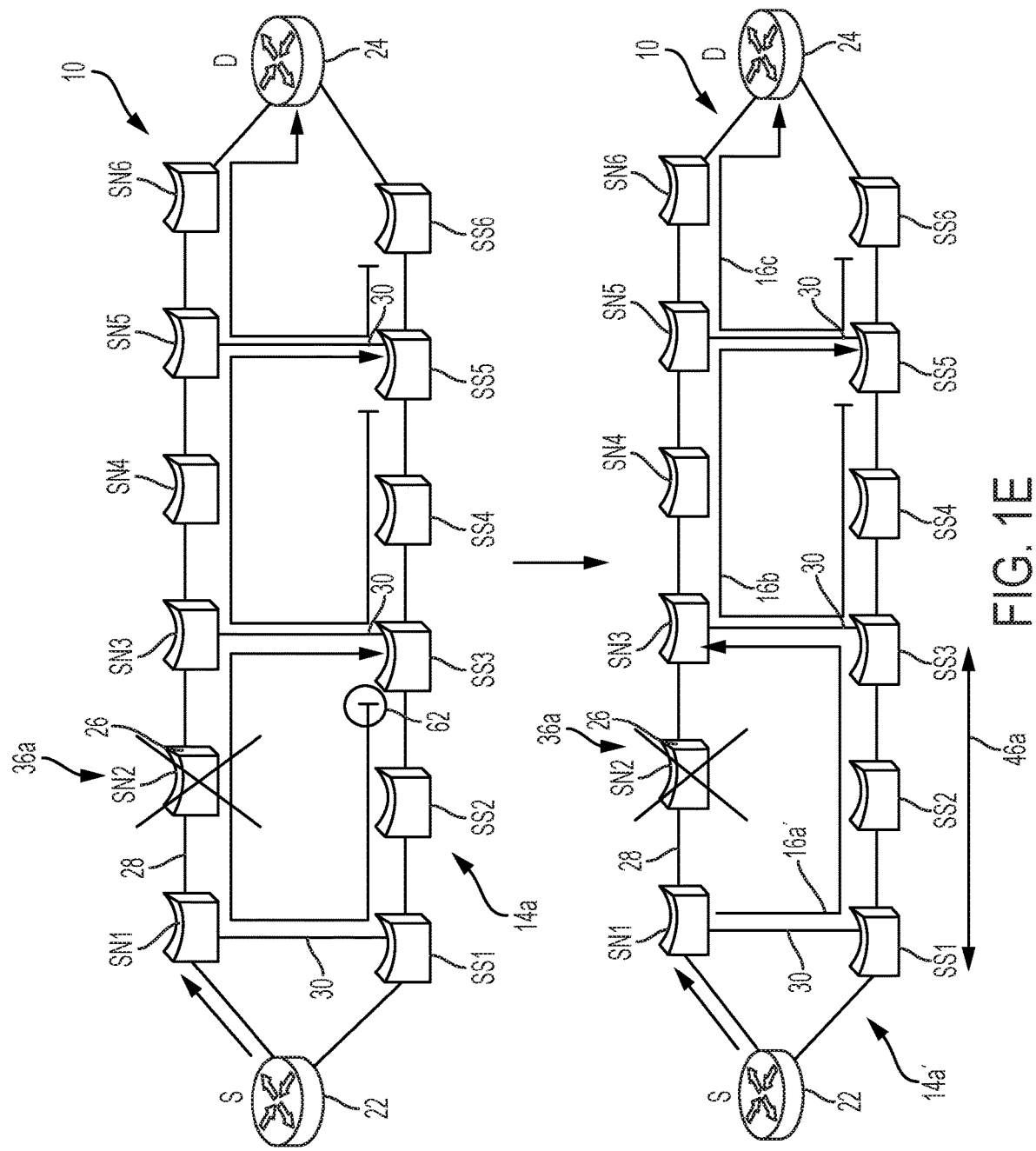
Figure 1F:
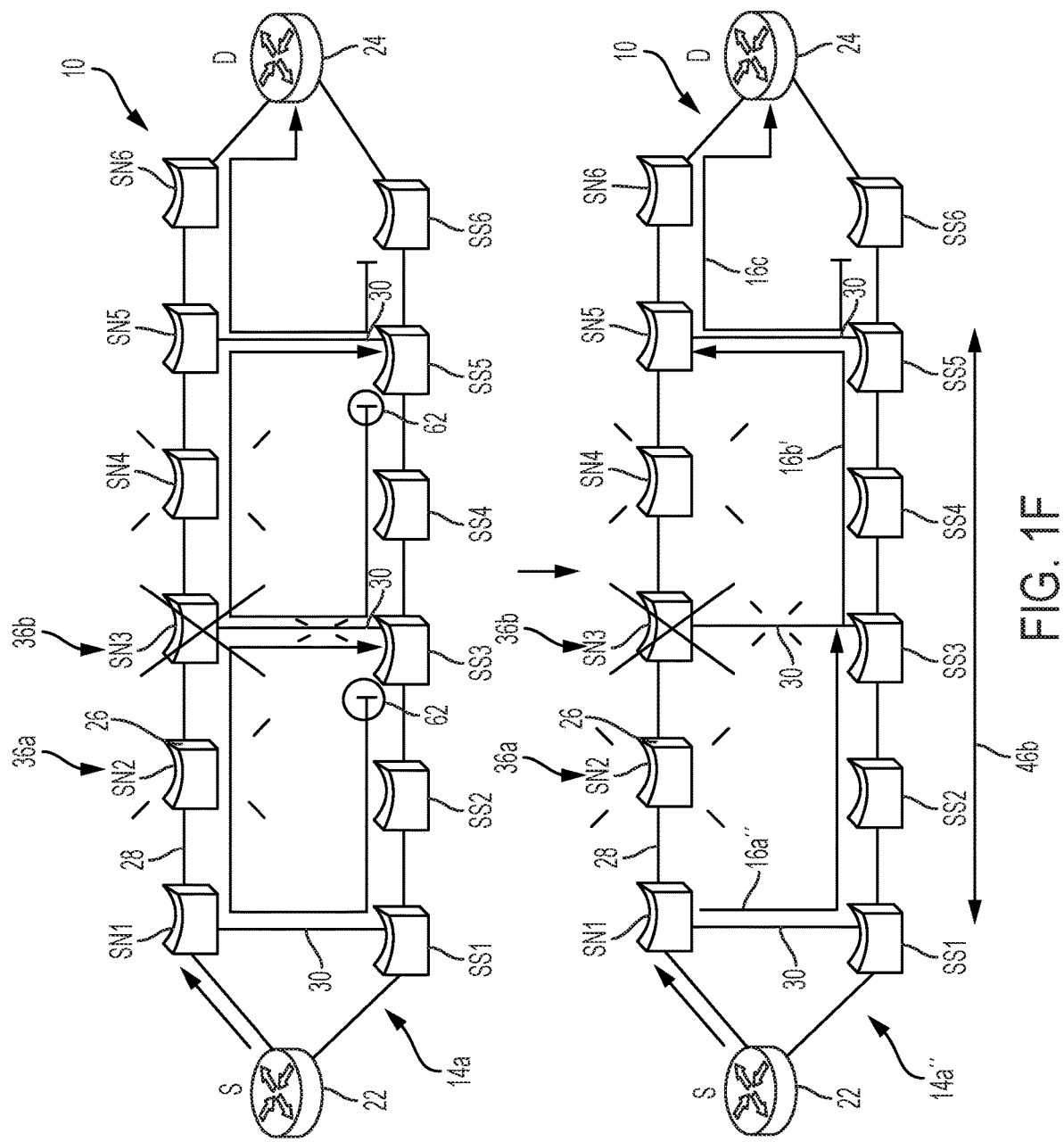
Figure 1G:
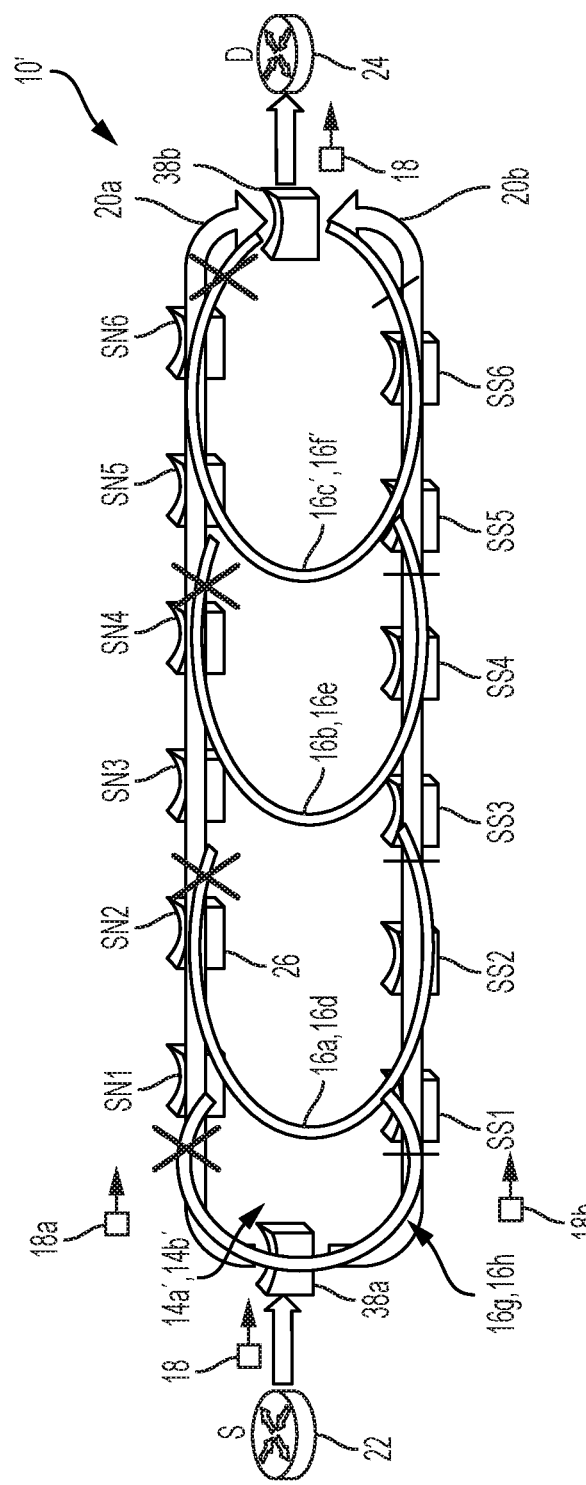
Figure 2:
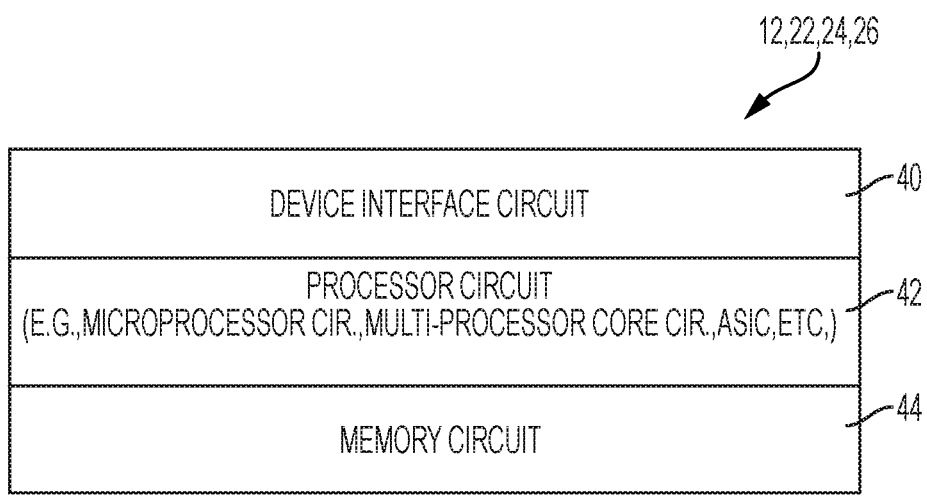
FIG. 2 illustrates an example implementation of any one of the devices of FIGS. 1A-1G, according to an example embodiment.

FIG. 2 illustrates an example implementation of any one of the devices 12, 22, 24, and/or 26 of FIGS. 1A-1G, according to an example embodiment.

Each apparatus 12, 22, 24, and/or 26 can include a device interface circuit 40, a processor circuit 42, and a memory circuit 44. The device interface circuit 40 can include one or more distinct physical layer transceivers for communication with any one of the other devices 12, 22, 24, and/or 26; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein. Each apparatus 12, 22, 24, 26 is a physical machine (i.e., a hardware device) configured for implementing network communications with other physical machines 12, 22, 24, 26 via the network 10. The term "configured for" or "configured to" as used herein with respect to a specified operation refers to a device and/or machine that is physically constructed and arranged to perform the specified operation. Hence, the apparatus 12 is a network-enabled (user machine providing user access to a network)/machine implementing network communications via the network 10.

Figure 3A:
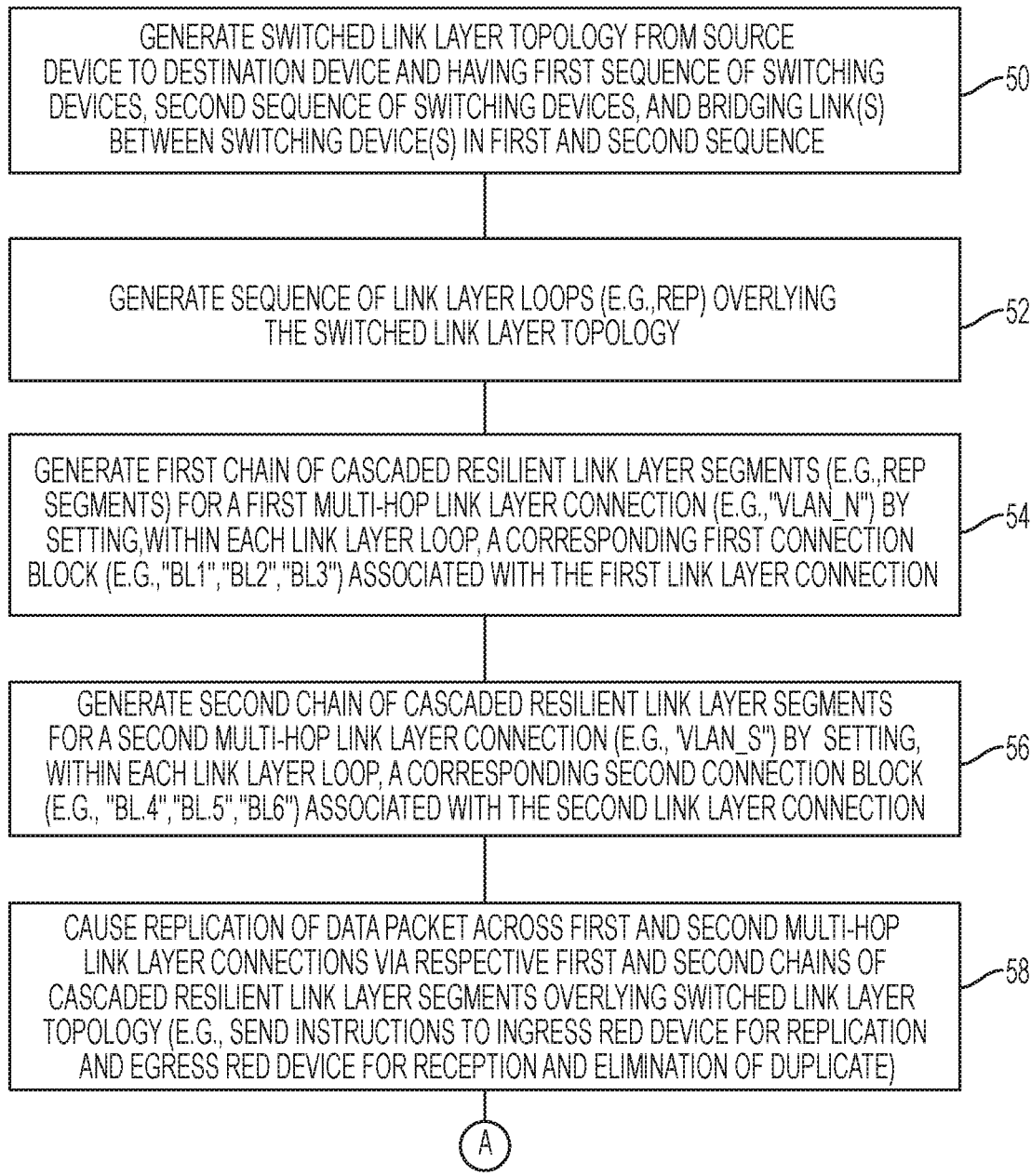
FIGS. 3A-3C illustrate a method of generating chains of resilient link layer segments for replication of a data along respective multi-hop link layer connections, according to an example embodiment.
Figure 3B:
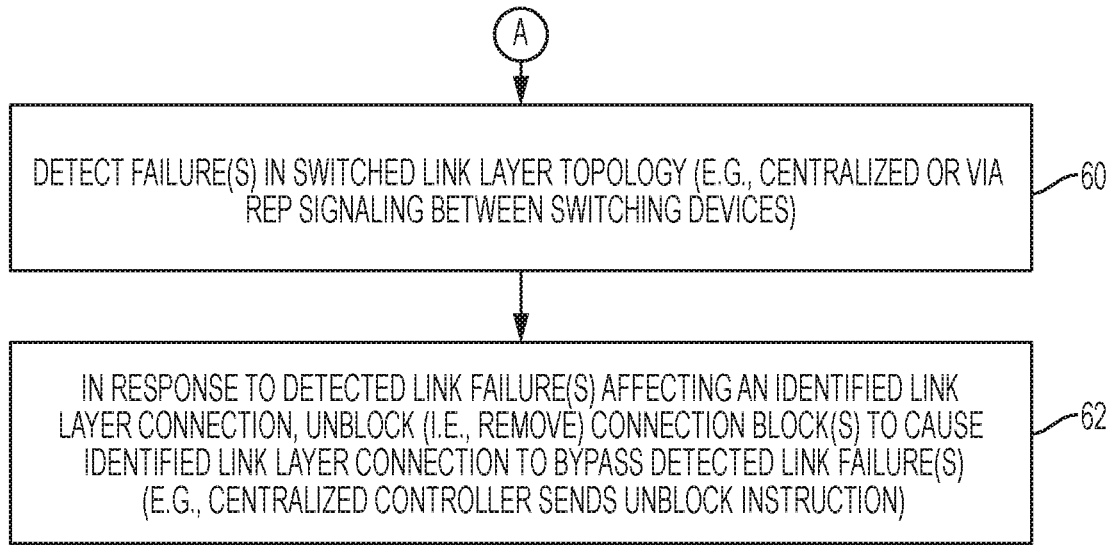
Figure 3C:
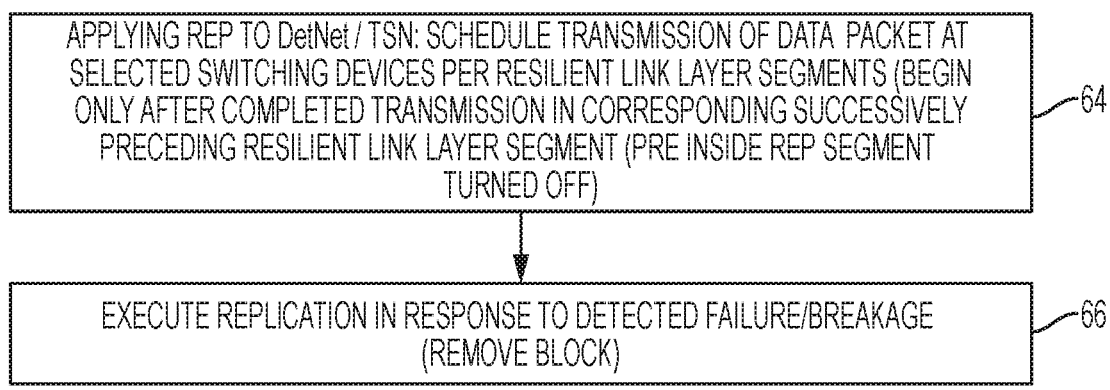

FIGS. 3A-3C illustrate a method of generating chains of resilient link layer segments for replication of a data along respective multi-hop link layer connections, according to an example embodiment.

According to an example embodiment, the controller device (e.g., a Path Computation Element (PCE), scheduler, etc.) 12 can be configured for centrally executing the operations described herein; any one or more of the switching devices 26 also can be configured for executing the described herein, for example as a "master" switching device, and/or based on distributed operations executed by some or all of the switching devices 26 according to a prescribed signaling protocol. Hence, unless stated otherwise, any of the operations described herein can be executed by the corresponding processor circuit 42 of any one of the controller device 12 and/or one or more of the switching devices 26.

The processor circuit 42 of any one of the controller device 12 and/or one or more of the switching devices 26 in operation 50 of FIG. 3 can be configured for generating the switched link layer topology 10 for link layer transmissions, including from a source network device "S" 22 to a destination network device "D" 24. The switched link layer topology 10 can be implemented for example as wired Ethernet data network. The switched link layer topology 10 can include a first sequence of switching devices (e.g., "SN1", "SN2", "SN3", "SN4", "SN5, "SN6") 26 interconnected by trunk data links (e.g., wired Ethernet links) 28 (also referred to as the "North-side" switch sequence), a second sequence of switching devices (e.g., "SS1", "SS2", "SS3", "SS4", "SS5, "SS6") 26 interconnected by trunk data links 28 (also referred to as the "South-side" switch sequence), and one or more bridging links 30 between the first and second sequences of switching devices.

As illustrated in FIGS. 1A-1G, the switched link layer topology 10 further comprises a first bridging link 30 configured for interconnecting the switching device "SN1" 26 and the switching device "SS1" 26; the switched link layer topology 10 further comprises a second bridging link 30 configured for interconnecting the switching device "SN3" 26 and the switching device "SS3" 26; and the switched link layer topology 10 further comprises a third bridging link 30 configured for interconnecting the switching device "SN5" 26 and the switching device "SS5" 26. The switched link layer topology 10 from the source network device "S" 22 to the destination network device "D" 24 can be generated by the controller device 12 based on signaling commands from the controller device 12 to the individual switching devices 26; alternately, a prescribed signaling protocol can be used between the switching devices 26 to establish the switched link layer topology 10.

Although only the switching device "SN2" 26 is illustrated with the reference numeral 26 to avoid cluttering in the Figures, it should be apparent that all the switching devices "SN1" through "SN6" and "SS1" through "SS6" are allocated the reference numeral "26" for purposes of the description herein. Further, although only the trunk data link 28 between the switching devices "SN1" and "SN2" is illustrated with the reference numeral 28 to avoid cluttering in the Figures, it should be apparent that all the data links (drawn as lines) between switching devices 26, between the source network device "S" 22 and a switching device 26, and/or between a switching device 26 and the destination network device "D" 24, also is allocated the reference numeral "28" for purposes of the description herein. Each bridging link 30 also is a trunk data link 28 with the additional feature that it interconnects a switching device in the "North" sequence (e.g., "SN3") with a switching device in the "South" sequence (e.g., "SS3").

The processor circuit 42 of the controller device 12 (and/or one or more of the switching devices 26 communicating via a prescribed signaling protocol) can generate first and second chains 14a, 14b of resilient link layer segments 16 for respective first and second multi-hop link layer connections (e.g., "VLAN_N" 20a, "VLAN_S" 20b) based on generating in operation 52 a sequence of link layer loops (32*a*, 32*b*, 32*c* of FIG. 1A) overlying the switched link layer topology 10, and initially setting for each of the first and second multi-hop link layer connections (e.g., "VLAN_N" 20*a*, "VLAN_S" 20*b*) in operations 54 and 56 a corresponding first and second set of connection blocks 34 in each link layer loop 32. Each of the connection blocks 34*a*, 34*b*, and 34*c* in the first set of connection blocks 34*a*, 34*b*, and 34*c* (associated with the first multi-hop link layer connection 20*a*) is illustrated in FIGS. 1B and 1C as a "slash" (e.g., "\") to distinguish from the second set of connection blocks 34*d*, 34*e*, and 34*f* (associated with the second multi-hop link layer connection 20*b*) that are illustrated in FIGS. 1B and 1D with "X-marks" (e.g., "X").

Each of the link layer loops 32*a* (via the switching devices "SS3", "SS2", "SS1", "SN1", "SN2", "SN3"), 32*b* (via the switching devices "SS5", "SS4", "SS3", "SN3", "SN4", "SN5"), and 32*c* (via the switching devices "SS6", "SS5", "SN5", "SN6"), illustrated in FIG. 1A, can be generated in operation 52, for example, by the controller device 12 and one or more switching devices 26 according to the Resilient Ethernet Protocol (REP).

As illustrated in FIG. 1B, the controller device 12 of FIG. 1A (and/or one or more of the switching devices 26 configured for providing control operations for the switched link layer topology 10) in operation 54 can establish between the source network device "S" 22 and the destination network device "D" 24 the first multi-hop link layer connection "VLAN_N" 20*a* and the multi-hop link layer connection "VLAN_S" 20*b*: each of the first and second multi-hop link layer connections 20*a*, 20*b* can be distinct first and second virtual local area network (VLAN) connections having distinct VLAN identifiers (e.g., "VLAN_N", "VLAN_S"), respectively. The first multi-hop link layer connection "VLAN_N" 20*a* is illustrated in the top portion of FIG. 1B as having an example multi-hop path of "SN1", "SN2", "SN3", "SN4", "SN5", and "SN6"; the second multi-hop link layer connection "VLAN_S" 20*b* is illustrated in the top portion of FIG. 1B as having an example multi-hop path of "SS1", "SS2", "SS3", "SS4", "SS5", and "SS6".

As illustrated in FIG. 1C, the controller device 12 of FIG. 1A (and/or one or more of the switching devices 26 configured for providing control operations for the switched link layer topology 10) can allocate and set in operation 54, for first multi-hop link layer connection "VLAN_N" 20*a*, the first set of connection blocks "BL1" 34*a*, "BL2" 34*b*, and "BL3" 34*c* within the link layer loops 32*a*, 32*b*, and 32*c* of FIG. 1A, respectively. In particular, the setting of the connection block "BL1" 34*a* in the link layer loop 32*a* results in the first resilient link layer segment 16*a* in the chain 14*a* for the first multi-hop link layer connection "VLAN_N" 20*a*; the setting of the connection block "BL2" 34*b* in the link layer loop 32*b* results in the second resilient link layer segment 16*b* in the chain 14*a* for the first multi-hop link layer connection "VLAN_N" 20*a*; and the setting of the connection block "BL3" 34*c* in the link layer loop 32*c* results in the third resilient link layer segment 16*c* in the chain 14*a* for the first multi-hop link layer connection "VLAN_N" 20*a* and ending at the destination network device "D" 24. Hence, the processor circuit 42 of the controller device 12 (and or/one or more of the switching devices 26) associates in operation 54 each of the connection blocks 34*a*, 34*b*, and 34*c* in the first set with the first multi-hop link layer connection "VLAN_N" 20*a*, resulting in creation of the first chain 14*a* (comprising the sequence of resilient link layer segments 16*a*, 16*b*, and 16*c*) for the first multi-hop link layer connection "VLAN_N" 20*a*.

The connection block 34*a* can be implemented, for example, based on the processor circuit 42 of the controller device 12 (and/or one or more of the switching devices 26) sending (via its corresponding device interface circuit 40) an instruction to the switching device "SS3" 26 to block any data traffic to or from the neighboring switching device "SS2" 26 that is associated with the first multi-hop link layer connection "VLAN_N" 20*a*. The connection block 34*b* can be implemented, for example, based on the processor circuit 42 of the controller device 12 (and/or one or more of the switching devices 26) sending an instruction to the switching device "SS5" 26 to block any data traffic to or from the switching device "SS4" 26 that is associated with the first multi-hop link layer connection "VLAN_N" 20*a*; and the connection block 34*c* can be implemented, for example, based on the processor circuit 42 of the controller device 12 (and/or one or more of the switching devices 26) sending an instruction to the switching device "SS6" 26 to block any data traffic to or from the switching device "SS5" 26 that is associated with the first multi-hop link layer connection "VLAN_N" 20*a*.

Hence, the connection block 34*a*, the connection block 34*b*, and the connection block 34*c* in the first set cause the switching devices "SS3", "SS5", and "SS6" to block any data packet associated with the first multi-hop link layer connection "VLAN_N" 20*a* and received from the neighboring switching devices "SS2", "SS4", and "SS5", respectively. The connection blocks 34*c*, 32*b*, and 34*a* also cause the switching devices "SS6", "SS5", and "SS3" also to block any further transmission to the neighboring switching devices "SS5", "SS4", and "SS2", respectively, of any data packets (e.g., advertisement messages originated by the destination network device "D" 24) associated with the first multi-hop link layer connection "VLAN_N" 20*a*. Hence, as illustrated in FIGS. 1B and 1C the first set of connection blocks 34*a*, 34*b*, and 34*c* cause the first chain 14*a* of resilient link layer segments 16*a*, 16*b*, and 16*c* associated with the first multi-hop link layer connection "VLAN_N" 20*a* to initially use the first sequence of switching devices "SN1", "SN2", "SN3", "SN4", "SN5", "SN6" 26; in other words, the first set of connection blocks 34*a*, 34*b*, and 34*c* initially block the first chain 14*a* of resilient link layer segments 16*a*, 16*b*, and 16*c* from using the second sequence of switching devices "SS1", "SS2", "SS3", "SS4", "SS5", "SS6" 26.

As illustrated in FIG. 1D, the processor circuit 42 of the controller device 12 of FIG. 1A (and/or one or more of the switching devices 26 configured for providing control operations for the switched link layer topology 10) can allocate and set in operation 56, for the second multi-hop link layer connection "VLAN_S" 20*b*, the connection blocks "BL4" 34*d*, "BL5" 34*e*, and "BL6" 34*f* within the link layer loops 32*a*, 32*b*, and 32*c* of FIG. 1A. In particular, the setting of the connection block "BL4" 34*d* in the link layer loop 32*a* results in the first resilient link layer segment 16*d* in the chain 14*b* for the second multi-hop link layer connection "VLAN_S" 20*b*; the setting of the connection block "BL5" 34*e* in the link layer loop 32*b* results in the second resilient link layer segment 16*e* in the chain 14*b* for the second multi-hop link layer connection "VLAN_S" 20*b*; and the setting of the connection block "BL6" 34*f* in the link layer loop 32*c* results in the third resilient link layer segment 16*f* in the chain 14*b* for the second multi-hop link layer connection "VLAN_S" 20*b* and ending at the destination network device "D" 24. Hence, the processor circuit 42 of the controller device 12 (and or/one of the switching devices 26) in operation 56 associates in operation 56 each of the connection blocks 34*d*, 34*e*, and 34*f* with the second multi-hop link layer connection "VLAN_S" 20b, resulting in creation of the second chain 14b (comprising the resilient link layer segments 16d, 16e, and 16f) for the second multi-hop link layer connection "VLAN_S" 20b.

Hence, as illustrated in FIGS. 1B and 1D the second set of connection blocks 34d, 34e, and 34f cause the second chain 14b of resilient link layer segments 16d, 16e, and 16f associated with the second multi-hop link layer connection "VLAN_S" 20a to initially use the second sequence of switching devices "SS1", "SS2", "SS3", "SS4", "SS5", "SS6" 26; in other words, the second set of connection blocks 34d, 34e, and 34f initially block the second chain 14b of resilient link layer segments 16d, 16e, and 16f from using the first sequence of switching devices "SN1", "SN2", "SN3", "SN4", "SN5", "SN6" 26.

The connection block 34d can be implemented, for example, based on sending an instruction to the switching device "SN3" 26 to block any data traffic to or from the neighboring switching device "SN2" 26 that is associated with the second multi-hop link layer connection "VLAN_S" 20b. The connection block 34e can be implemented, for example, based on sending an instruction to the switching device "SN5" 26 to block any data traffic to or from the switching device "SN4" 26 that is associated with the second multi-hop link layer connection "VLAN_S" 20b; and the connection block 34f can be implemented, for example, based on sending an instruction to the switching device "SN6" 26 to block any data traffic to or from the switching device "SN5" 26 that is associated with the second multi-hop link layer connection "VLAN_S" 20b. Hence, the connection block 34d, the connection block 34e, and the connection block 34f cause the switching devices "SN3", "SN5", and "SN6" to block any data packet associated with the second multi-hop link layer connection "VLAN_S" 20b and received from the neighboring switching devices "SN2", "SN4", and "SN5", respectively. The connection blocks 34f, 32e, and 34d also cause the switching devices "SN6", "SN5", and "SN3" also to block any further transmission to the neighboring switching devices "SN5", "SN4", and "SN2", respectively, of any data packets (e.g., advertisement messages originated by the destination network device "D" 24) associated with the second multi-hop link layer connection "VLAN_S" 20b.

Hence, as illustrated in FIG. 1B the controller device 12 (and/or one or more of the switching devices 26) can create the first chain 14a of resilient link layer segments 16a, 16b, 16c for the multi-hop link layer connection 20a, and the second chain 14b of resilient link layer segments 16d, 16e, and 16f for the multi-hop link layer connection 20b, overlying the same switched link layer topology 10.

Consequently, the processor circuit 42 of the controller device 12 (and/or one or more of the switching devices 26) in operation 58 can cause replication of a data packet 18 across the first and second multi-hop link layer connections 20a, 20b, via the respective chains 14a, 14b of resilient link layer segments. As illustrated in FIGS. 1B, 1E, and 1F, the use of the chains 14a, 14b of resilient link layer segments 16 enable a failure 36 in the switched link layer topology 10 (e.g., 36a of FIG. 1E; 36b of FIG. 1F) to be bypassed based on the controller device 12 (and/or one or more of the switching devices 26) removing at least one of the connection blocks 34, described below.

As illustrated in FIGS. 1A-1F, the source network device "S" 22 can be configured by instructions generated and sent by the processor circuit 42 of the controller device 12 (and/or one or more of the switching devices 26) in operation 58 for generating the replicated copies 18a, 18b of the data packet 18, and sending the first replicated copy 18a to the switching device "SN1" 26, and the second replicated copy 18b to the switching device "SS1" 26. In one embodiment, the processor circuit 42 of the source network device "S" 22 can specify the corresponding VLAN identifier "VLAN_N" in the replicated copy 18a destined for the switching device "SN1" 26, and the processor circuit 42 of the source network device "S" 22 can specify the corresponding VLAN identifier "VLAN_S" in the replicated copy 18b destined for the switching device "SS1" 26. Hence, processor circuit 42 of the controller device 12 (and/or one or more of the switching devices 26) in operation 58 can cause replication based on sending an instruction to the source network device "S" 22 to replicate and send the data packet 18a, 18b across the first and second VLAN connections 20a, 20b using the respective VLAN identifiers "VLAN_N" and "VLAN_S".

Alternately, the processor circuit 42 of the controller device 12 (and/or one or more of the switching devices 26) can be configured for causing the switching device "SN1" 26 to respond to reception of the data packet 18a from the source network device "S" 22 by inserting the corresponding VLAN identifier "VLAN_N", and causing the switching device "SS1" 26 to respond to reception of the data packet 18b from the source network device "S" 22 by inserting the corresponding VLAN identifier "VLAN_S". Hence, the processor circuit 42 of the controller device 12 (and/or one or more of the switching devices 26) in operation 58 can cause replication based on sending an instruction to the switching devices "SN1" and "SS1" to send the respective replicated data packets 18a, 18b across the first and second VLAN connections 20a, 20b using the respective VLAN identifiers "VLAN_N" and "VLAN_S".

In another embodiment illustrated in FIG. 1G, a switched link layer topology 10' can include a first replication/elimination device (RED) 38a and a second replication/elimination device 38b, for example in cases where a source network device "S" 22 is incapable of generating a replicated data packet. In this example, the source network device "S" 22 sends a single copy of the data packet 18 to the replication/elimination device 38a. The processor circuit 42 of the controller device 12 (and/or one or more of the switching devices 26) in operation 58 can cause replication based on sending an instruction to the first replication/elimination device 38a (configured for receiving the data packet 18 from the source network device "S" 22), causing the first replication/elimination device 38a to initiate replication of the data packet 18 destined for the destination network device "D" 24 (identifiable, for example based on the link layer source address-destination address pair) by inserting the VLAN identifier "VLAN_N" into the data packet 18a and the VLAN identifier "VLAN_S" into the data packet 18b, and forwarding the respective replicated data packets 18a, 18b across the first and second VLAN connections 20a, 20b toward the respective ingress switching devices "SN1" and "SS1" using the respective VLAN identifiers "VLAN_N" and "VLAN_S". As apparent from the foregoing, the processor circuit 42 of the controller device 12 (and/or one or more of the switching devices 26) in operations 52, 54, and 56 can generate the chains 14a, 14b of resilient link layer segments 16 that include the resilient link layer segment 16g for the chain 14a (supplying the data packet 18a to the resilient link layer segment 16a), and the resilient link layer segment 16h for the chain 14b (supplying the data packet 18b to the resilient link layer segment 16d). The resilient link layer segments 16 also include the resilient link layer segment 16c' and resilient link layer segment 16f' that each end at the replication/elimination device 38*b* (instead of the destination network device "D" 24 as in FIGS. 1A-1F).

The processor circuit 42 of the controller device 12 (and/or one or more of the switching devices 26) in operation 58 also can send a second instruction to the second replication/elimination device 38*b*, which is configured for receiving the replicated data packets 18*a*, 18*b* from egress switching devices "SN6" 26 and "SS6" 26 associated with the first and second multi-hop link layer connections "VLAN_N" 20*a* and "VLAN_S" 20*b*, respectively. The second instruction can cause the processor circuit 42 of the second replication/elimination device 38*b* to forward a single copy of the data packet 18 to the destination network device "D" 24, and eliminate any duplicate copy of the data packet 18. Hence, the second instruction causes the second replication/elimination device 38*b* to forward a single copy of the data packet 18 to the destination network device "D" 24.

As described previously, the use of the chains 14*a*, 14*b* of resilient link layer segments 16 enables the processor circuit 42 of the controller device 12 (and/or one or more of the switching devices 26) to bypass a failure 36 in the switched link layer topology 10 (e.g., 36*a* of FIG. 1E; 36*b* of FIG. 1F) based on removing at least one of the connection blocks 34.

Referring to FIG. 3B, the processor circuit 42 of the controller device 12 (and/or one or more of the switching devices 26) can detect in operation 60 one or more failures 36 in the switched link layer topology 10 that affect the multi-hop link layer connection "VLAN_N" 20*a* and/or the multi-hop link layer connection "VLAN_S" 20*b*, for example based on centralized monitoring by the controller device 12, or by prescribed signaling between the switching devices 26. The switching devices 26 can detect in operation 60 one or more failures 36 according to a prescribed signaling protocol such as REP. In response to the processor circuit 42 of the controller device 12 (and/or one or more of the switching devices 26) detecting one or more detected failures 36 (e.g. 36*a* of FIG. 1E or 36*b* of FIG. 1F), the processor circuit 42 of the controller device 12 (and/or one or more of the switching devices 26) in operation 62 can cause an identified multi-hop link layer connection 20 to bypass the detected link failure 36.

As illustrated in FIG. 1E, the processor circuit 42 of the controller device 12 (and/or one or more of the switching devices 26) in operation 62 can respond to the detected failure 36*a* at the switching device "SN2" 26 (or one or more of its data links 28 coupling the switching device "SN2" to its neighboring switching devices "SN1" and "SN3") by sending an instruction to the appropriate switching device "SS3" 26 for removing in operation 62 the connection block 34*a* that was initially added as illustrated in FIG. 1C. The removal of the connection block 34*a* in operation 62 results in the modified chain 14*a*' that enables the multi-hop link layer connection "VLAN_N" 20*a* to bypass the failure 36*a* using the modified resilient link layer segment 16*a*' (comprising the switching device sequence "SN1", "SS1", "SS2", "SS3", and "SN3"), 16*b*, and 16*c*. Hence, the hop-by-hop path for the data packet 18*a* via the chain 14*a*' associated with the multi-hop link layer connection "VLAN_N" 20*a* becomes "S-SN1-SS1-SS2-SS3-SN3-SN4-SN5-SN6-D". As illustrated in FIG. 1E, the bypassing of the failure 36*a* causes the multi-hop link layer connections 20*a* and 20*b* to at least temporarily share the link layer connection "SS1"-"SS2"-"SS3" as a shared portion 46*a*.

As illustrated in FIG. 1F, the example embodiments also can bypass one or more substantial failures, illustrated for example as the second failure 36*b* in the switching device "SN3" 26 that also can affect the neighboring switching devices "SN2" and "SN4" 26 in the "North" sequence that rely on the bridging link 30 provided by the "SN3" for reaching its neighboring switching device "SS3" 26 in the "South" sequence. As illustrated in FIG. 1F, the failure 36*b* can be a second failure that follows the failure 36*a*; alternately, the nature of the failure 36*b* can be sufficient to disable any operations by the switching device "SN2" 26, regardless of any failure 36*a*.

Hence, the processor circuit 42 of the controller device 12 (and/or one or more of the switching devices 26) in operation 62 can respond to the detected failure 36*b* at the switching device "SN3" 26 by sending first and second instructions to the switching devices "SS3" 26 and "SS5" 26 for removing in operation 62 the connection blocks 34*a* and 34*b*, respectively. The removal of the connection blocks 34*a* and 34*b* in operation 62 results in the modified chain 14*a*" that enables the multi-hop link layer connection "VLAN_N" 20*a* to bypass the failures 36*a* and 36*b* using the modified resilient link layer segment 16*a*" (comprising the switching device sequence "SN1", "SS1", "SS2", and "SS3"), 16*b*' (comprising the switching device sequence "SS3", "SS4", "SS5", and "SN5"), and 16*c*. Hence, the hop-by-hop path for the data packet 18*a* via the chain 14*a*" associated with the multi-hop link layer connection "VLAN_N" 20*a* becomes "S-SN1-SS1-SS2-SS3-SS4-SS5-SN5-SN6-D". As illustrated in FIG. 1F, the bypassing of the failures 36*a* and 36*b* causes the multi-hop link layer connections 20*a* and 20*b* to at least temporarily share the link layer connection "SS1"-"SS2"-"SS3"-"SS4"-"SS5" as a shared portion 46*b*.

Hence, the example embodiments enable rapid link-layer bypass of a failure in the switched link layer topology 10 for an affected multi-hop link layer connection 20, ensuring the corresponding copy of the data packet 18 can be delivered to the egress switching device and/or the destination network device "D" 24, as appropriate. Unlike prior implementations of PRP and PRE that provide a limited level of protection to only one breakage, the example embodiments enable rapid recovery from multiple breakages in the switched link layer topology 10. The example embodiments provide improvements in resilience in "1+1 redundancy technologies" such as PRP or PRE; further, the example embodiments provide improved reliability and resiliency in Internet of Things technologies or other technologies (e.g., industrial automation, power automation, autonomous vehicles, etc.) that demand highly reliable and resilient control systems. Use of REP as described above enables a detected failure to be bypassed (based on removing one or more connection blocks 34) within 200 milliseconds (ms) or less.

FIG. 3C illustrates a variation of the above-described example embodiments, where REP as described above with respect to FIGS. 1A-1G can be applied to a deterministic network that has prescribed and highly-constrained scheduling requirements, for example DetNet and/or TSN: in this case, example embodiments can utilize Packet Replication and Elimination.

Referring to FIG. 3C, processor circuit 42 of the controller device 12 (and/or one or more of the switching devices 26) in operation 64 is configured for scheduling transmission of the data packet 18 at selected switching devices 26 based on the resilient link layer segments 16. For example, assuming a DetNet/TSN deployment in FIG. 1C, the processor circuit 42 of the controller device 12 (and/or one or more of the switching devices 26) in operation 64 can schedule transmission in each resilient link layer segment (e.g., 16*b*)

to begin only after completed transmission in a corresponding successively preceding resilient link layer segment (e.g., 16a); in other words, the source network device "S" 22 can be allocated (e.g., by the controller device 12) a scheduled time interval (or timeslot) "t1" for transmission to the switching device "SN1" and/or "SS1", and the switching devices 26 in the resilient link layer segment 16a can be allocated (by the controller device 12) the range of scheduled time intervals "t1" to "t6", enabling any of the switching devices "SN1", "SN2", "SN3", "SS1", SS2", and/or "SS3" to propagate the data packet 18a along the resilient link layer segment 16a to the next resilient link layer segment 16b; the switching devices 26 in the resilient link layer segment 16b can be allocated (by the controller device 12) the range of scheduled time intervals "t7" to "t12", enabling any of the switching devices "SN3", "SN4", "SN5", "SS3", SS4", and/or "SS5" to propagate the data packet 18a along the resilient link layer segment 16b to the next resilient link layer segment 16c; and the switching devices 26 in the resilient link layer segment 16c can be allocated (by the controller device 12) the range of scheduled time intervals "t13" to "t16", enabling any of the switching devices "SN5", "SN6", "SS5", "SS6" to propagate the data packet 18a along the resilient link layer segment 16c toward the destination network device "D" 24.

In the example of using scheduled transmissions, normally the PRE inside a resilient link layer segment 16 (operating, for example, according to REP) is disabled to save bandwidth and energy. Hence, the processor circuit 42 of the controller device 12 (and/or one or more of the switching devices 26) in operation 66 can cause replication to be executed in a selected one of the resilient link layer segments in response to a detected failure or breakage (e.g., 36a of FIG. 1E), and can further cause a corresponding removal of at least one of the connection blocks (e.g., 34a). Hence, in response to the detected failure 36a, the processor circuit 42 of the controller device 12 (and/or one or more of the switching devices 26) can send an instruction causing the switching device "SN1" 26 to replicate the data packet 18 for transmission onto the data link 28 toward the switching device "SN2" 26, plus transmission of the replicated copy of the data packet 18 onto the bridging link 30 toward the switching device "SS1" 26, illustrated by the resilient link layer segment 16a' in the lower portion of FIG. 1E. Hence, in operation 66 PRE can be triggered automatically by the REP protocol flow that unblocks the ports, and the PRE replication can be halted in response to detecting subsequent REP signaling indicating recovery from the failure 36a.

Hence, the replication of the data packet 18 for transmission by the switching device "SN1" to the switching device "SS1" 26 via the bridging link 30 enables the data packet to bypass the failure 36, while enabling the succeeding resilient link layer segments 16b and 16c to deterministically transmit the data packet 18 according to the time intervals (or time slots) allocated to the resilient link layer segments 16b and 16c. Hence, the example embodiments can be applied to various deterministic networks, including TSN, TTTech, 6TiSCH, Audio Video Bridging (AVB), etc. Hence, REP can be applied to PRP and DetNet for fast link layer rerouting that bypasses a detected failure in the switched link layer topology 10, while maintaining the deterministic properties of TSN/TTTech flows by scheduling the local reroutes along the resilient link layer segments 16.

Referring to FIG. 2, each apparatus 12, 22, 24, and/or 26 can include a device interface circuit 40, a processor circuit 42, and a memory circuit 44. The device interface circuit 40 can include one or more distinct physical layer transceivers for communication with any one of the other devices 12, 22, 24, and/or 26; the device interface circuit 40 also can include an IEEE based Ethernet transceiver, TTTech, DetNet, TSN etc., for communications with the devices of FIG. 1 via any type of data link (e.g., a wired or wireless link, an optical link, etc.). The switching devices 26, for example, can be implemented using Cisco® Industrial Ethernet (IE) 4000. Series switches, commercially available from Cisco Systems, San Jose, Calif.

The processor circuit 42 can be configured for executing any of the operations described herein, and the memory circuit 44 can be configured for storing any data or data packets as described herein. Each apparatus 12, 22, 24, 26 is a physical machine (i.e., a hardware device) configured for implementing network communications with other physical machines 12, 22, 24, 26 via the network 10. The term "configured for" or "configured to" as used herein with respect to a specified operation refers to a device and/or machine that is physically constructed and arranged to perform the specified operation. Hence, the apparatus 12 is a network-enabled (user machine providing user access to a network)/machine implementing network communications via the network 10.

Any of the disclosed circuits of the devices 12, 22, 24, and/or 26 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
generating a switched link layer topology from a source device to a destination device, the switched link layer topology comprising a first sequence of switching devices, a second sequence of switching devices, and one or more bridging links between the first and second sequences of switching devices;
generating first and second chains of resilient link layer segments for respective first and second multi-hop link layer connections based on generating a sequence of link layer loops overlying the switched link layer topology via one or more of the bridging links, setting for the first multi-hop link layer connection a first set of connection blocks in the respective link layer loops, and setting for the second multi-hop link layer connection a corresponding second set of connection blocks in the respective link layer loops, the first set of connection blocks different from the second set of connection blocks; and
causing replication of a data packet across the first and second multi-hop link layer connections, enabling a failure in the switched link layer topology to be bypassed based on removing at least one of the connection blocks for an affected one of the first or second multi-hop link layer connections, causing network traffic to utilize a modified resilient link layer segment between the first and second sequences of switching devices.

2. The method of claim 1, wherein each of the first and second multi-hop link layer connections are distinct first and second virtual local area network (VLAN) connections having distinct VLAN identifiers, respectively, the causing replication including replicating the data packet across the first and second VLAN connections using the respective VLAN identifiers.

3. The method of claim 1, further comprising:
detecting the failure in the switched link layer topology; and
causing the failure to be bypassed in the switched link layer topology based on sending an instruction causing the removal of at least one of the connection blocks for an affected one of the first or second multi-hop link layer connections.

4. The method of claim 3, further comprising:
detecting a second failure in the switched link layer topology; and
causing the second failure to be bypassed in the switched link layer topology based on sending a second instruction causing the removal of a second of the connection blocks for a second affected one of the first or second multi-hop link layer connections.

5. The method of claim 1, wherein:
the generating of the first and second chains of resilient link layer segments includes initially setting the first set of the connection blocks associated with the first multi-hop link layer connection to block the first chain of resilient link layer segments from using the second sequence of switching devices, and initially setting the second set of the connection blocks associated with the second multi-hop link layer connection to block the second chain of resilient link layer segments from using the first sequence of switching devices, the second set of connection blocks initially set reciprocally to the first set of connection blocks;
wherein removal of one of the connection blocks for an affected portion of the first multi-hop link layer connection causes the first multi-hop link layer connection to bypass the failure in the first sequence of switching devices by utilizing a portion of the second sequence of switching devices.

6. The method of claim 1, wherein:
the causing replication includes sending an instruction to a first replication/elimination device, configured for receiving the data packet from the source device, to initiate replication of the data packet toward ingress switching devices associated with the first and second multi-hop link layer connections;
the causing further including sending an instruction to a second replication/elimination device, configured for receiving the replicated data packets from egress switching devices associated with the first and second multi-hop link layer connections and further configured for forwarding a single copy of the data packet to the destination device, to forward to the destination device a single copy of the data packet.

7. The method of claim 1, further comprising:
scheduling transmission of the data packet at selected switching devices based on the resilient link layer segments, including scheduling transmission in each resilient link layer segment to begin only after completed transmission in a corresponding successively preceding resilient link layer segment;

the causing replication executed in a selected one of the resilient link layer segments in response to the detected failure and corresponding removal of at least one of the connection blocks.

8. An apparatus comprising:

a processor circuit configured for generating a switched link layer topology from a source device to a destination device, the switched link layer topology comprising a first sequence of switching devices, a second sequence of switching devices, and one or more bridging links between the first and second sequences of switching devices;

the processor circuit further configured for generating first and second chains of resilient link layer segments for respective first and second multi-hop link layer connections based on generating a sequence of link layer loops overlying the switched link layer topology via one or more of the bridging links, setting for the first multi-hop link layer connection a first set of connection blocks in the respective link layer loops, and setting for the second multi-hop link layer connection a corresponding second set of connection blocks in the respective link layer loops, the first set of connection blocks different from the second set of connection blocks; and a device interface circuit configured for causing replication of a data packet across the first and second multi-hop link layer connections, enabling a failure in the switched link layer topology to be bypassed based on removing at least one of the connection blocks for an affected one of the first or second multi-hop link layer connections, causing network traffic to utilize a modified resilient link layer segment between the first and second sequences of switching devices.

9. The apparatus of claim 8, wherein each of the first and second multi-hop link layer connections are distinct first and second virtual local area network (VLAN) connections having distinct VLAN identifiers, respectively, the causing replication including replicating the data packet across the first and second VLAN connections using the respective VLAN identifiers.

10. The apparatus of claim 8, wherein the processor circuit is configured for:

detecting the failure in the switched link layer topology; and causing the failure to be bypassed in the switched link layer topology based on sending an instruction causing the removal of at least one of the connection blocks for an affected one of the first or second multi-hop link layer connections.

11. The apparatus of claim 10, wherein the processor circuit is configured for:

detecting a second failure in the switched link layer topology; and causing the second failure to be bypassed in the switched link layer topology based on sending a second instruction causing the removal of a second of the connection blocks for a second affected one of the first or second multi-hop link layer connections.

12. The apparatus of claim 8, wherein:

the generating of the first and second chains of resilient link layer segments includes initially setting the first set of the connection blocks associated with the first multi-hop link layer connection to block the first chain of resilient link layer segments from using the second sequence of switching devices, and initially setting the second set of the connection blocks associated with the second multi-hop link layer connection to block the second chain of resilient link layer segments from using the first sequence of switching devices, the second set of connection blocks initially set reciprocally to the first set of connection blocks;

wherein removal of one of the connection blocks for an affected portion of the first multi-hop link layer connection causes the first multi-hop link layer connection to bypass the failure in the first sequence of switching devices by utilizing a portion of the second sequence of switching devices.

13. The apparatus of claim 8, wherein:

the causing replication includes sending an instruction to a first replication/elimination device, configured for receiving the data packet from the source device, to initiate replication of the data packet toward ingress switching devices associated with the first and second multi-hop link layer connections;

the causing further including sending an instruction to a second replication/elimination device, configured for receiving the replicated data packets from egress switching devices associated with the first and second multi-hop link layer connections and further configured for forwarding a single copy of the data packet to the destination device, to forward to the destination device a single copy of the data packet.

14. The apparatus of claim 8, wherein the processor circuit is configured for:

scheduling transmission of the data packet at selected switching devices based on the resilient link layer segments, including scheduling transmission in each resilient link layer segment to begin only after completed transmission in a corresponding successively preceding resilient link layer segment;

causing the replication to be executed in a selected one of the resilient link layer segments in response to the detected failure and corresponding removal of at least one of the connection blocks.

15. One or more non-transitory tangible media encoded with logic for execution by a machine and when executed by the machine operable for:

generating a switched link layer topology from a source device to a destination device, the switched link layer topology comprising a first sequence of switching devices, a second sequence of switching devices, and one or more bridging links between the first and second sequences of switching devices;

generating first and second chains of resilient link layer segments for respective first and second multi-hop link layer connections based on generating a sequence of link layer loops overlying the switched link layer topology via one or more of the bridging links, setting for the first multi-hop link layer connection a first set of connection blocks in the respective link layer loops, and setting for the second multi-hop link layer connection a corresponding second set of connection blocks in the respective link layer loops, the first set of connection blocks different from the second set of connection blocks; and causing replication of a data packet across the first and second multi-hop link layer connections, enabling a failure in the switched link layer topology to be bypassed based on removing at least one of the connection blocks for an affected one of the first or second multi-hop link layer connections, causing network traffic to utilize a modified resilient link layer segment between the first and second sequences of switching devices.

16. The one or more non-transitory tangible media of claim 15, wherein each of the first and second multi-hop link layer connections are distinct first and second virtual local area network (VLAN) connections having distinct VLAN identifiers, respectively, the causing replication including replicating the data packet across the first and second VLAN connections using the respective VLAN identifiers.

17. The one or more non-transitory tangible media of claim 15, further operable for:
   detecting the failure in the switched link layer topology; and
   causing the failure to be bypassed in the switched link layer topology based on sending an instruction causing the removal of at least one of the connection blocks for an affected one of the first or second multi-hop link layer connections.

18. The one or more non-transitory tangible media of claim 15, wherein:
   the generating of the first and second chains of resilient link layer segments includes initially setting the first set of the connection blocks associated with the first multi-hop link layer connection to block the first chain of resilient link layer segments from using the second sequence of switching devices, and initially setting the second set of the connection blocks associated with the second multi-hop link layer connection to block the second chain of resilient link layer segments from using the first sequence of switching devices, the second set of connection blocks initially set reciprocally to the first set of connection blocks;
   wherein removal of one of the connection blocks for an affected portion of the first multi-hop link layer connection causes the first multi-hop link layer connection to bypass the failure in the first sequence of switching devices by utilizing a portion of the second sequence of switching devices.

19. The one or more non-transitory tangible media of claim 15, wherein:
   the causing replication includes sending an instruction to a first replication/elimination device, configured for receiving the data packet from the source device, to initiate replication of the data packet toward ingress switching devices associated with the first and second multi-hop link layer connections;
   the causing further including sending an instruction to a second replication/elimination device, configured for receiving the replicated data packets from egress switching devices associated with the first and second multi-hop link layer connections and further configured for forwarding a single copy of the data packet to the destination device, to forward to the destination device a single copy of the data packet.

20. The one or more non-transitory tangible media of claim 15, further operable for:
   scheduling transmission of the data packet at selected switching devices based on the resilient link layer segments, including scheduling transmission in each resilient link layer segment to begin only after completed transmission in a corresponding successively preceding resilient link layer segment;
   the causing replication executed in a selected one of the resilient link layer segments in response to the detected failure and corresponding removal of at least one of the connection blocks.

* * * * *